United States Patent
Nguyen et al.

(10) Patent No.: US 7,522,299 B2
(45) Date of Patent: Apr. 21, 2009

(54) SYSTEM AND METHOD FOR AUTOMATIC CONFIGURATION

(75) Inventors: Amanda Giang-Tien Nguyen, Bothell, WA (US); Ivan Pavicevic, Kirkland, WA (US); Michael P. Fenelon, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 10/608,410

(22) Filed: Jun. 30, 2003

(65) Prior Publication Data

US 2004/0263900 A1    Dec. 30, 2004

(51) Int. Cl.
G06F 3/12 (2006.01)
G06K 15/02 (2006.01)

(52) U.S. Cl. .................. 358/1.15; 358/1.16; 358/1.9

(58) Field of Classification Search .............. 358/1.18, 358/1.9, 1.15, 1.16; 710/8, 10; 709/222, 709/223
See application file for complete search history.

(56) References Cited

U.S. PATENT DOCUMENTS

| | | | |
|---|---|---|---|
| 6,814,510 B1 * | 11/2004 | Sabbagh et al. ............... 400/63 |
| 7,168,003 B2 * | 1/2007 | Lozano et al. ................ 714/25 |
| 2002/0188646 A1 * | 12/2002 | Terrill et al. ................ 709/101 |
| 2003/0200291 A1 * | 10/2003 | Kemp et al. ................. 709/222 |

* cited by examiner

Primary Examiner—Edward L Coles
Assistant Examiner—Thomas J Lett
(74) Attorney, Agent, or Firm—Shook, Hardy & Bacon LLP

(57) ABSTRACT

A system and method for automatic configuration upon installation of a network printer are disclosed. The techniques of the invention avoid the burden of manual configuration by users and system administrators. The network printer is associated with printer description files, a driver, a spooler, and a port monitor. The system comprises bi-directional application program interfaces associated with the spooler for allowing the driver to generate a bi-directional request and receive a bi-directional response. The system additionally includes a syntax within the printer description files for representing and associating the bi-directional request and the bi-directional response with a print feature. The system also includes extension files stored in the driver for relating bi-directional values and printer values and a notification infrastructure controlled by the port monitor for providing a bi-directional notification of configuration changes to the driver and selected applications.

32 Claims, 6 Drawing Sheets

SYSTEM AND METHOD FOR AUTOMATIC CONFIGURATION

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

This invention relates to the field of configuring a system upon installation of a network device and in particular to automatic configuration upon installation of a network printer.

BACKGROUND OF THE INVENTION

Today, installing a network printer is a time consuming and difficult task. Those individuals installing the network printer are generally required to perform a plurality of steps to obtain a static Internet Protocol (IP) address, create a queue, manually configure the queue, manually set a device configuration for the queue, print a test page, and send mail to users with instructions on how to connect with the newly installed network printer.

The available processes for network printer installation are cumbersome to both small and large organizations. Within large organizations, the process of network printer installation is costly for administrators, especially when manual device configuration is required for hundreds of devices with different feature sets. Small organizations typically will not have a dedicated administrator or the expertise to perform the installation.

As a specific example, with currently available installation techniques, after installing a device with duplexing capability, the user or administrator must manually go to the user interface (UI), and set the duplex unit to "installed" in order to perform two-sided printing. Furthermore, subsequent to installation, when the administrator or users add or remove installable options such as the envelope tray or memory, they must manually go to the UI to show the changes.

Accordingly an improved technique is needed for network printer installation. In particular, a technique that eliminates manual configuration is desired. Automatic configuration could save the extensive effort involved in obtaining the correct feature set after installing a large number of network devices. Thus, users would have access to features available on the network devices automatically without any user or administrator intervention.

SUMMARY OF THE INVENTION

In one aspect, the invention includes a system for automatic configuration upon installation of a network printer, wherein the network printer is associated with printer description files, a driver, a spooler, and a port monitor. The system includes bi-directional application program interfaces associated with the spooler for allowing the driver to generate a bi-directional request and a bi-directional response. The system additionally includes a syntax within the printer description files for representing and associating the bi-directional request and the bi-directional response with a print feature. The system further includes extension files stored in the driver for relating bi-directional values and printer values and a notification infrastructure controlled by the port monitor for providing a bi-directional notification of configuration changes to the driver and selected applications.

In an additional aspect, the invention includes a system for facilitating client retrieval of bi-directional information upon installation of a network device. The system includes a set of bi-directional constructs within a device description file, a port monitor for receiving the bi-directional constructs, for retrieving data from the network device in accordance with the bi-directional constructs, transforming the data into an appropriate format, creating a channel, and sending the transformed data. The system additionally includes a spooler that has a mechanism for receiving installation notifications over the created channel from the port monitor and routing the installation notifications to selected applications.

In yet a further aspect, the invention includes a method for automatic configuration upon installation of a network printer, wherein the network printer is associated with a printer description file, a driver, a spooler, and a port monitor. The method includes getting a list of installable features and corresponding bi-directional requests from the printer description file. The method additionally includes calling bi-directional application program interfaces from the spooler to query for a current configuration of the installable features and mapping bi-directional schema to a printer-specific protocol. The method additionally includes generating and routing a bi-directional notification, mapping bi-directional responses to a feature from the printer description file, and updating an application with a current configuration.

BRIEF DESCRIPTION OF THE DRAWINGS

The present invention is described in detail below with reference to the attached drawing figures, wherein.

DETAILED DESCRIPTION OF THE INVENTION

Figure 1:
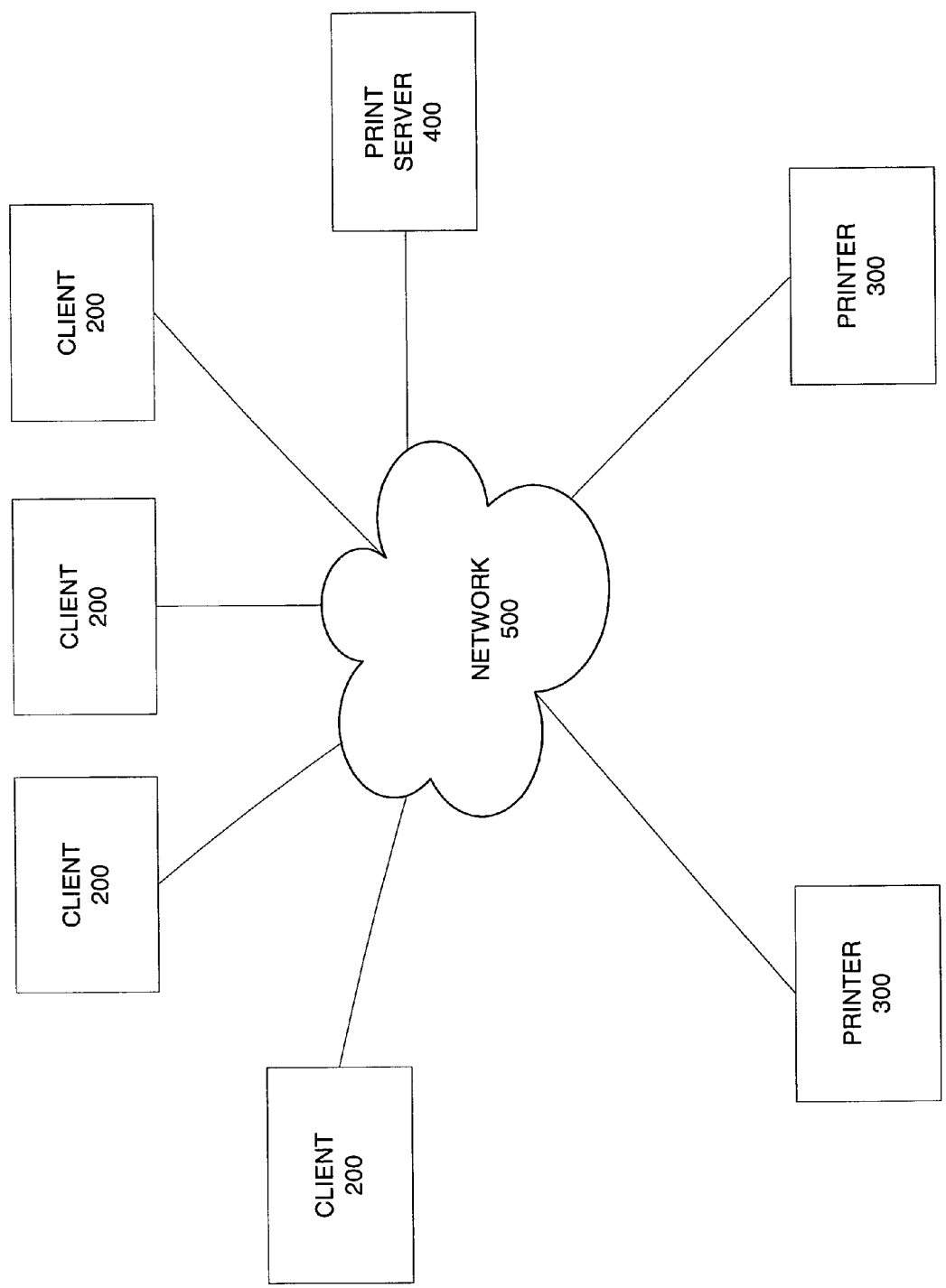
FIG. 1 is a block diagram showing a components of a system environment including a network printer.

FIG. 1 is a block diagram illustrating an environment in which a system of the invention may be implemented. Multiple client computers 200 are connected with network printers 300 over a network 500. The client computers 200 and the network 500 may be similar to those described above with reference to FIG. 2 below. A print server 400 may also be connected with client computers 200 and printers 300 over the network 500. In the displayed environment, the printers 300 are available to serve the client computers 200 over the network 500. Additional network devices such as a network scanner may be included in addition to network printers 300.

Figure 2:
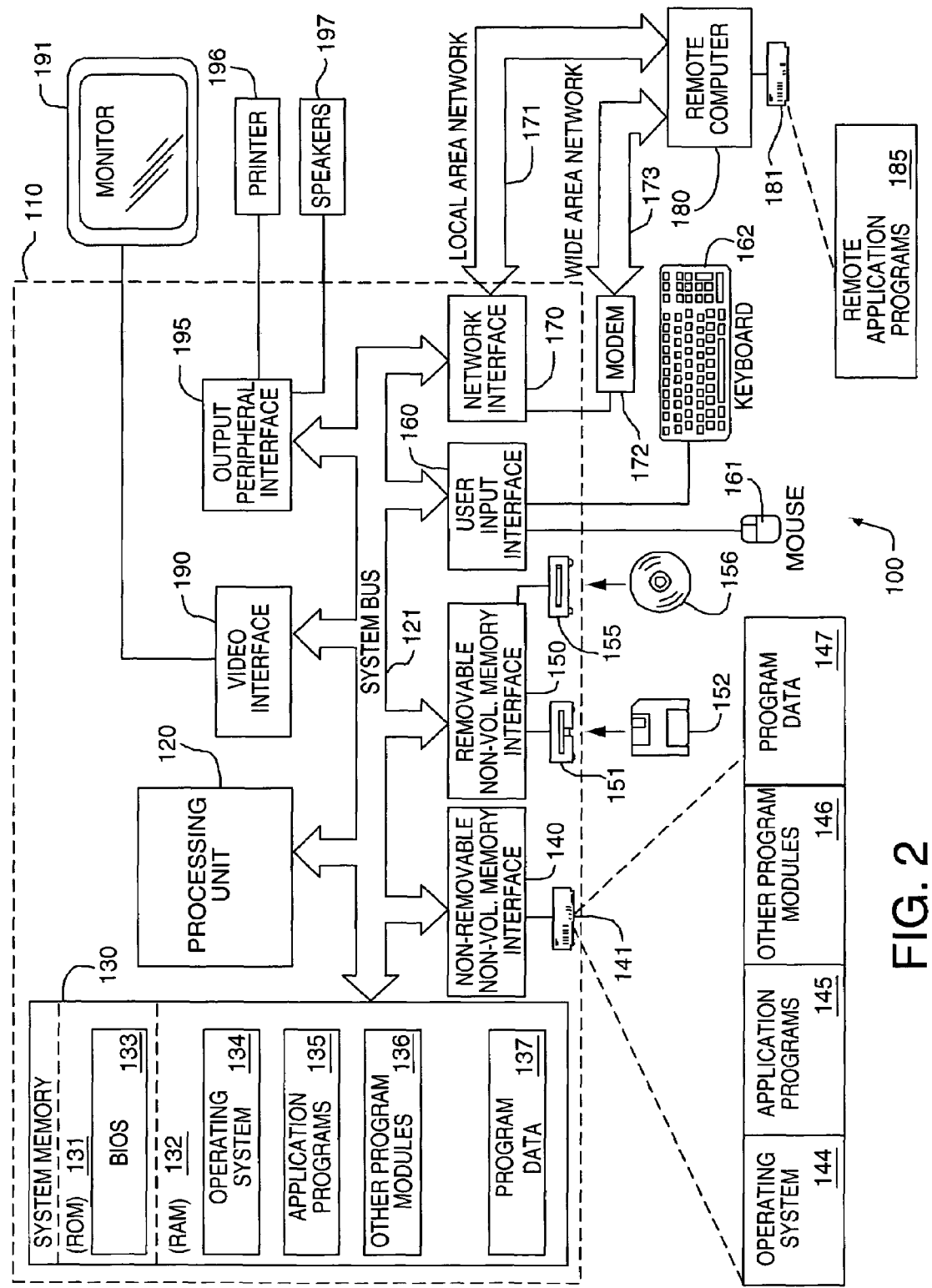
FIG. 2 is a block diagram of a suitable computing system environment for use in implementing a client computer of the present invention.

FIG. 2 illustrates an example of a suitable computing system environment 100 on which the invention may be implemented. In particular, the client computer 200 shown in FIG. 1 may be implemented in the computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 3:
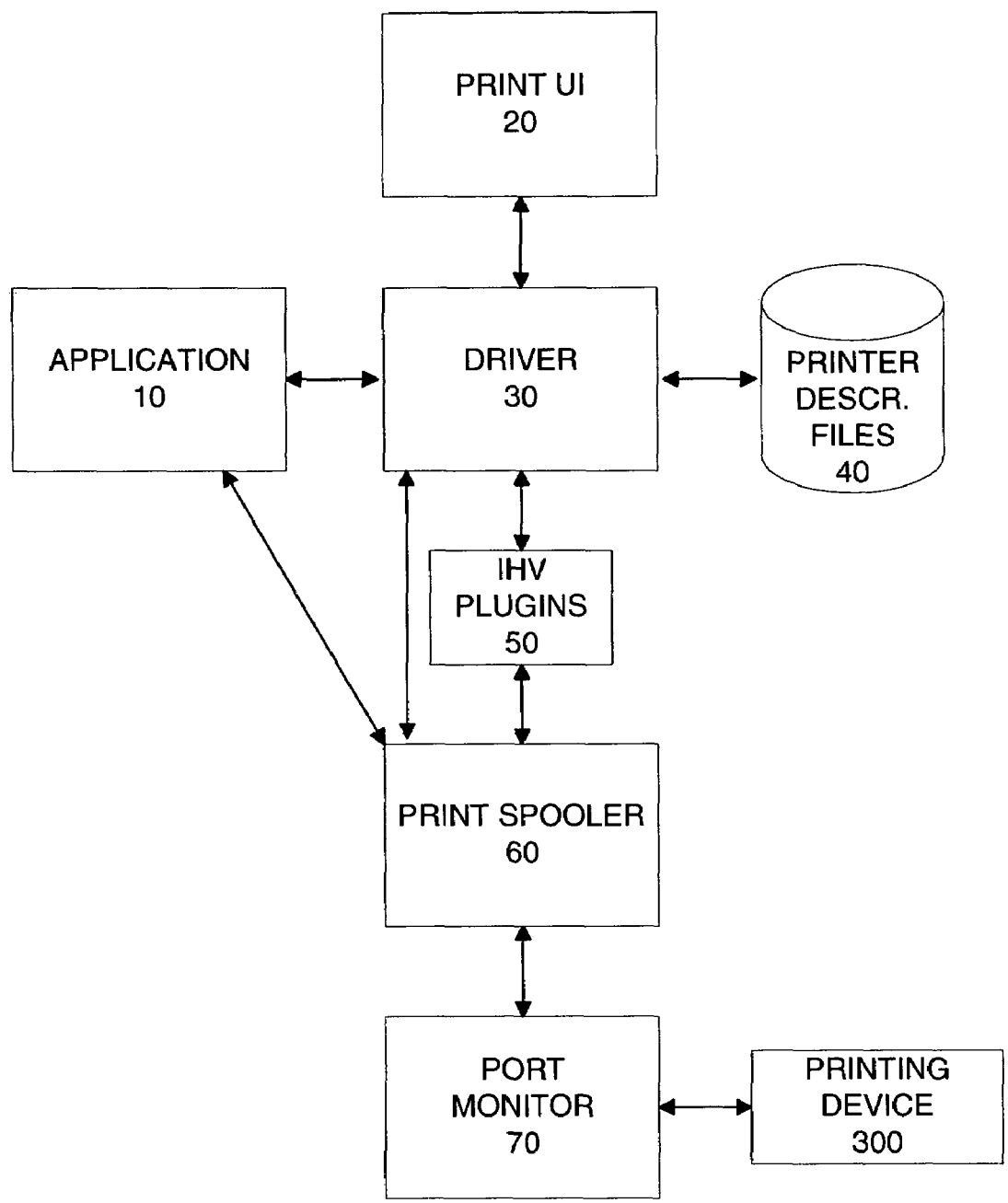
FIG. 3 is a block diagram illustrating a system for automatic configuration in accordance with an embodiment of the invention.

FIG. 3 is a block diagram illustrating components of the system of the invention. These components may be incorporated in the environment described above with reference to FIGS. 1 and 2. The components displayed include a driver 30 communicating with a UI 20, applications 10, and printer description files 40. The components additionally include Independent Hardware Vendor (IHV) plug-ins 50, a print spooler 60, a port monitor 70, and the printing device 300, which may be disposed within one of the components described above with respect to FIG. 1. The printer description files 40 will typically reside within the driver 30. The driver 30, the UI 20, and the applications 10 will typically be associated with the client computer 200 as shown in FIG. 1. Upon receiving a print request, the driver 30 can retrieve features from the printer description file 40. The print spooler 60 receives communicates with both the driver 30 and the port monitor 70. The port monitor 70 communicates directly with the printing device 300. IHV plug-ins 50 are capable of operating between the driver 30 and the print spooler 60. All of the aforementioned components and the communications between the aforementioned components are further described below.

Figure 4:
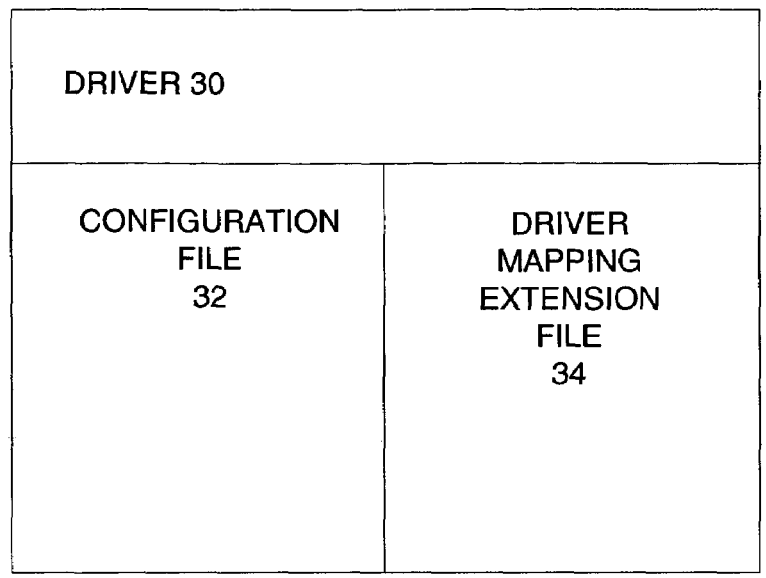
FIG. 4 is a block diagram illustrating a driver in accordance with an embodiment of the invention.

FIG. 4 illustrates tools contained within the driver 30 in an embodiment of the invention. The driver 30 typically includes the printer description files 40 and a driver mapping extension file 34. The driver 30 provides an indication to the user, through the UI 20, of available printing capabilities. The driver mapping extension files 34 provide a mechanism for mapping between the driver 30 and the printer 300 and will be described in greater detail below. The printer description files 40 include a general program description (GPD) and/or general description language (GDL) file that provide a description of printing options available. GPD is a text based format for describing capabilities of device and is easy to change or update. GDL is an internally developed language with keywords to help describe capabilities of printer. The printer description files 40 includes tools for describing to the driver 30 what kind of information is required to inform the user regarding capabilities of the printing device 300. The printer description file 40 may include options such as duplex options, number of input bins, paper tray, color, size of memory, stapler, and other possible options. Also, printer options may change after purchase, thus making updates important. Maintaining knowledge of the correct configuration of the printer 300 is important for optimum performance and important for allowing the user to take advantage of all capabilities of the printer 300.

As an example, a client 200 may know that a network printer 300 has a duplexer, but may not know how to print on two sides of the page. In order to print on two sides of a page, the client would ordinarily be required to traverse a plurality of levels to change the duplexer from "not installed" to "installed". In a network environment, an administrator is ordinarily charged with such a task. The features of the present system enable this procedure to occur automatically.

In the disclosed embodiments, as will be further described below, the driver 30 will seek a current configuration upon installation of network devices such as the printer 300. The driver 30 can monitor the printer 300 continuously for configuration updates. The driver 30 may search for updates the first time a client uses a printer 300 and every time the printer 300 is started thereafter. Accordingly, if the printer 300 acquires additional features, the system will be automatically updated.

For the automatic configuration capability, the driver 30 needs the capability to automatically connect options with the questions of the client 200. Suppose the client 200 wants to know whether a duplexer is present. The driver 30 needs to interpret the response from the printer 300. Accordingly, the printer description files 40 include a syntax for describing bi-directional (bidi) information. The syntax includes extensions to pre-existing GDL files. The extensions allow a client 200 to define a question to ask and how to interpret the answers.

The syntax includes at least two new constructs. The new constructs include (1) bidi queries and (2) bidi responses. Both are predetermined with knowledge of available features. The bidi query encapsulates query information and the bidi response encapsulates response information. The syntax contained within the printer description files 40 associates the bidi response and the bidi query with the features in the printer description files 40.

The syntax also includes a plurality of keywords. A query string keyword is a keyword for the bidi query construct and specifies a bidi schema string as the query string. A response type keyword is a keyword for the bidi response construct and specifies a type of the response to the query.

A response data keyword is also a keyword for the bidi response construct. The response data keyword specifies the features of the response. The response data keyword may be used to map responses that map to other features rather than the feature in which the query is initiated. As an example for the use of a response data keyword, a query in the "input tray" feature can yield responses related to the "papersize" feature. The response data keyword serves as an association between the "input tray" feature and the "papersize" feature.

A bidi value keyword is a keyword for the bidi response construct associated with available options. It specifies an expected bidi response for each option. The bidi value keyword is a string representation of an anticipated response where the response is mapped to one of a feature's options. This bidi value keyword can be used in conjunction with the response data keyword to map responses back to pairs of features and options. Table 1 illustrates examples of the keyword types.

TABLE 1

\*BidiQuery: Instance
{
    \*QueryString: " "
    \*%The string is expected to be translated to Unicode
}
\*BidiResponse: Instance
{
    \*ResponseType: BIDI_INT - Indicates bidi data is an integer
        BIDI_BOOL - Indicates that the bidi data is either TRUE or FALSE
        BIDI_STRING - Indicates that the bidi data is a Unicode string
    \*ResponseData: ENUM_OPTION(\*Feature))
    \*%Feature represents the name of the feature for responses.
}

For illustration purposes, one feature of the printer is an "input bin". An "envelope feeder" represents an option associated with the input bin. Another feature is "paper size". Options associated with "paper size" might include "letter" and "legal. Accordingly, the above-identified constructs and keywords of printer description file 40 can be used in three levels in GDL including (1) globally; (2) feature; or (3) option level.

Table 2 provides an example of use of the constructs and keywords at a global level.

TABLE 2

\*BidiQuery: Manufacturer
{
    \*QueryString: "\Device:Manufacturer"

TABLE 2-continued

```
    }
    *BidiResponse: Manufacturer
    {
        *ResponseType: BIDI_STRING
    }
```

Through this query and response scenario, the client computer 200 is able to determine the manufacturer of a network printing device.

Table 3 provides an example for operation of the constructs and keywords at a feature level.

TABLE 3

```
*Feature: DuplexUnit
{
    *BidiQuery: DuplexInstalled
    {
    *QueryString: "\Printer.DuplexUnit:CurrentValue"
    }
    *BidiResponse: DuplexInstalled
    {
        *ResponseType:BIDI_BOOL
        *ResponseData:ENUM_OPTION(DuplexUnit)
    }
    *Option: NotInstalled
    {
        *BidiValue: FALSE
    }
    *Option: Installed
    {
        *BidiValue: TRUE
    }
}
```

Through the use of constructs and keywords in the example displayed above, the client computer is able to ensure that duplex unit is installed.

Table 4 provides an example of use of the constructs and keywords at the option level.

TABLE 4

```
*Feature: InputBin
{
*Option: EnvelopeFeeder
{
    *BidiQuery: MediaSize
    {
        *QueryString: "\Printer.Input.Envelope:MediaSize"
    }
    *BidiResponse: MediaSize
    {
        *ResponseType: BIDI_STRING
        *ResponseData: ENUM_OPTION(papersize)
    *BidiQuery: MediaType
    {
        *QueryString: "\Printer.Input.Envelope:MediaType"
    }
    *BidiResponse: MediaType
    {
        *ResponseType: BIDI_STRING
        *ResponseData: ENUM_OPTION(MediaType)
    }
    *BidiQuery: MediaLevel
    {
        *QueryString: "\Printer.Input.Envelope:Level"
    }
    *BidiResponse: MediaLevel
```

TABLE 4-continued

```
    {
        *ResponseType: BIDI_STRING
        *ResponseData: ENUM_OPTION(MediaLevel)
    }
}
```

Through the use of the above-described constructs, the client computer 200 can ensure that the requested options of an envelope feeder feature are installed.

Additionally, IHVs plug-ins 50 can include extensions of instances of the bidi query and bidi response constructs. For example, *BidiQuery: HPSuperStapling, *BidiResponse: HPSuperStapling. The above-mentioned query and response describe a feature specific to a feature provided by a given manufacturer. Furthermore, IHV plug-ins 50 can extend attributes of the bidi query and bidi response constructs. For example: *BidiQuery: SuperDuperFeature {*QueryString:" "*HPSuperQuery:"" }. In this example, the query string is related to a search for a specific set of features available on a device provided by a given manufacturer.

Figure 5:
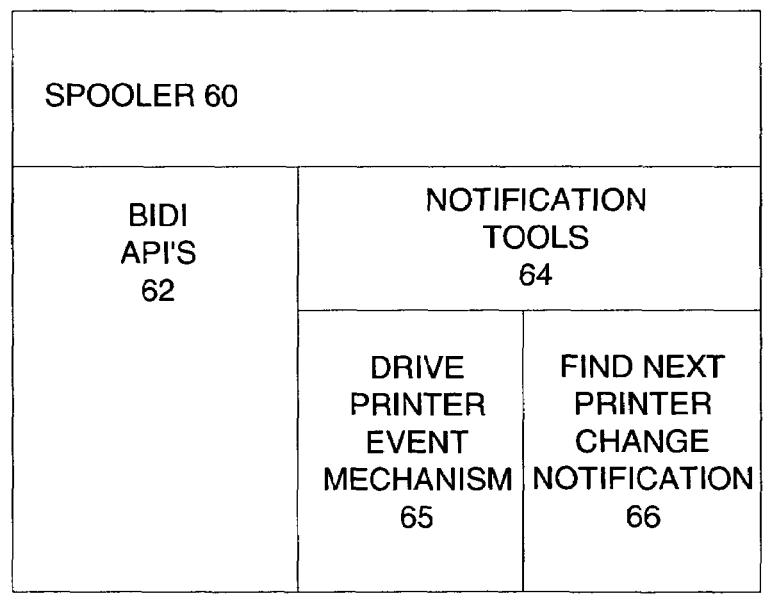
FIG. 5 is a block diagram illustrating a spooler in accordance with an embodiment of the invention.

FIG. 5 shows a more detailed view of the spooler 60 introduced in FIG. 3. The spooler includes a set of bidi application program interfaces (APIs) 62 and notification tools 64. The notification tools 64 include a driver printer event mechanism 65 and a find next printer change notification 66. These components are further described below.

In order to process the above-described bidi queries and responses, the driver 30 sends its query string through the bidi APIs 62. The printer 300 and port monitor 70 subsequently return information in a response that could be a True, False or other string. Each new bidi API 62 defines one API function for executing a bidi query and an extensible markup language (XML) based schema.

Actions supported by the bidi APIs 62 include "Get", "Enum", and "Set" The "Get" action requires an argument with a schema string that addresses a property or value. If the argument addresses a property, the bidi API 62 will retrieve all values under this property. The "Enum" action requires an argument with a schema string that addresses a property or value. For a property, the bidi API retrieves the list of schemas under this property. The "Set" action requires two arguments including a schema string that addresses a value and a new data value.

A request through a bidi API 62 may be represented shown below. The request contains a Bidi Action such as "Set", "Get", "GetAll", and "EnumSchema" and one or more schemas or query strings. The request is an XML string that defines an action together with the list of bidi schemas to be processed.

TABLE 5

```
<?xml version-"1.0"?>
<bidi:Request xmlns:bidi="bidi_ns">
    <Get schema="\Printer.DuplexUnit:Installed'?>
    <Get schema="\Printer.InputBin.TopBin"/>
</bidi:Request>
```

In the example of Table 5, the client 200 requests available options related to the duplex unit and input bin features.

The XML string shown in Table 6 represents a response to the request. The response is an XML string that contains the result of requested actions:

TABLE 6

```
<?xml version="1.0"?>
<bidi: Response xmlns:bidi="bidi_ns">
    <Get schema="\Printer.duplexunit:Installed" status= "0">
        <Schema name="\Printer.duplexunit.installed">
            <bidi:Bool value='false'/>
        </schema>
    </Get>
    <Get schema="\Printer.Inputbin.topbin" status="0">
        <schema name="\printer.inputbin.topbin:installed">
            <bidi:bool value="true"/>
        </schema>
        <schema name="\printer.inputbin.topbin:level>
            <bidi:Int value="45"/>
        </schema>
        <schema name="\Priner.Inputbin.topbin.mediasize">
            <bidi:string value="letter"/>
        </schema>
        <schema name="\Priner.Inputbin.topbin.mediatype">
            <bidi:string value="stationery"/>
        </schema>
    </Get>
</bidi: Response>
```

The port monitor 70 as shown in FIG. 3 provides an abstraction of device-specific protocol, by mapping from the bidi schema to the printer specific protocol. To be able to respond to a bidi request, the port monitor 70 requires the capability to (1) retrieve necessary data from the printer's database, (2) Calculate and/or transform data and (3) return data thru Bidi APIs 62. The above-described mapping may be specific to a Standard Transmission Control Protocol/Internet Protocol (TCP/IP) Port Monitor (SPM). SPM uses Simple Network Management Protocol (SNMP) as the printer specific protocol to retrieve data stored in the printer's Management Information Bases (MIBs).

Some of the data values defined in the standard bidi schema are not directly related to data from the printer's MIB. In this case, the driver 30 uses the associated extension file 34 that describes the mapping between bidi and MIB values. The example extension file illustrated below in Table 7 relates MIB and bidi values.

extensions from the extension file 34 and receive notifications as they change. The following Table 8 illustrates this concept.

TABLE 8

```
<?xml version="1.0"?>
<tcpbidi:Root xmlns:tcpbidi="temporary bidi namespace">
    <schema>
        <property name="printer">
            <property name="system">
                <value name="name" oid="1.3.6.1.2.1.1.5" type=
                    "BIDI_TEXT"/>
                <value name="descr" oid="1.3.6.1.2.1.1.1" type=
                    "BIDI_TEXT"/>
            </property>
        </schema>
</tcpbidi:Root>
```

The port monitor 70 includes a notification structure that creates an asynchronous notification channel using the spooler notification mechanism 64. The port monitor 70 provides a mechanism for sending data from the printer 300 to the driver 30. The port monitor 70 sends data as an XML file according to the above-described bidi schema. This type of notification is published as a bidi notification global unique identifier (BIDI_NOTIFICATION_GUID) so any application can register to listen for it. When a change occurs, the port monitor 70 creates a notification message according to the published bidi notification schema. Each notification message can contain one or more port related sections and each port section can contain one or more schema changes. A port section is part of the notification message that contains bidi schema changes for a particular port. The port monitor 70 can create one notification message common to more than one port. Each port section addresses particular ports by a port name. The notification router uses port section information to route schema changes to an appropriate printer.

The spooler 60 creates a special listener object on an opposite side of the BIDI_NOTIFICATION_GUID channel. This object receives the messages from the port monitor 70 and routes them in an appropriate direction according to a flag specified in each schema change. Notifications will be routed

TABLE 7

```
?xml version="1.0"?>
<tcpbidi;Root xmlns;tcpbidi="temporary Bidi namespace".
    <Schema>
        <property name='printer">
            <property name="layout">
                <property name="Inputbin">
                    <inputbin name="manual bin"> mibname="manualpaper"/>
                    <inputbin name="envelopemanual"
                        mibname="manualenvelope"/>
                    <inputbin name="bottombin"
                        mibname="tray1"/>
                </property>
            </property>
            <property name="output">
                <propertyname="outputbin">
                    <outputbin name="topbin" mibname="standard bin"/>
                </property>
            </property>
        </property>
    </schema>
</tcpbidi:Root>
```

In addition, the extension file 34 can contain extensions of standard bidi schema. Data values described using the extension file 34 are driver specific. The client can ask for IHV to the driver 30 using the driver printer event mechanism 65 only if the schema change has specified flag "drive printer event". The spooler 60 will route notifications to any registered applications using the find next printer change notification mechanism 66 regardless of the flag in the schema change.

Table 9 provides a sample notification provided by the notification tools 64.

TABLE 9

```
<?xml version="1.0"?>
<bidi: Notification xmlns:bidi="bidi_ns">
    <port name="port 1">
        <schema name="\printer.duplexunit:Installed"
        drvprinterevent="true">
            <bidi: Bool value="true"/>
        </schema>
        <schema name="\printer.alerts.alert001.code">
            <bidi:string value="low toner"/>
        </schema>
    </port>
</bidi:Notification>
```

This notification provides the driver 30 with a printer alert message indicating that a low level of toner is present.

If the port monitor 70 estimates that the number of changes is so large such that the number separate notifications would be burdensome, it will send a common notification signal instead of schema changes. A common notification provides a signal indicating that a number of bidi schema values have changed. A sample notification message is provided below in Table 10.

TABLE 10

```
<?xml version="1.0"?>
<bidi:Notification xmlns:bidi="bidi_ns">
    <Port name="port_1>
        <Event/>
    </port>
</bidi:Notification>
```

Figure 6:
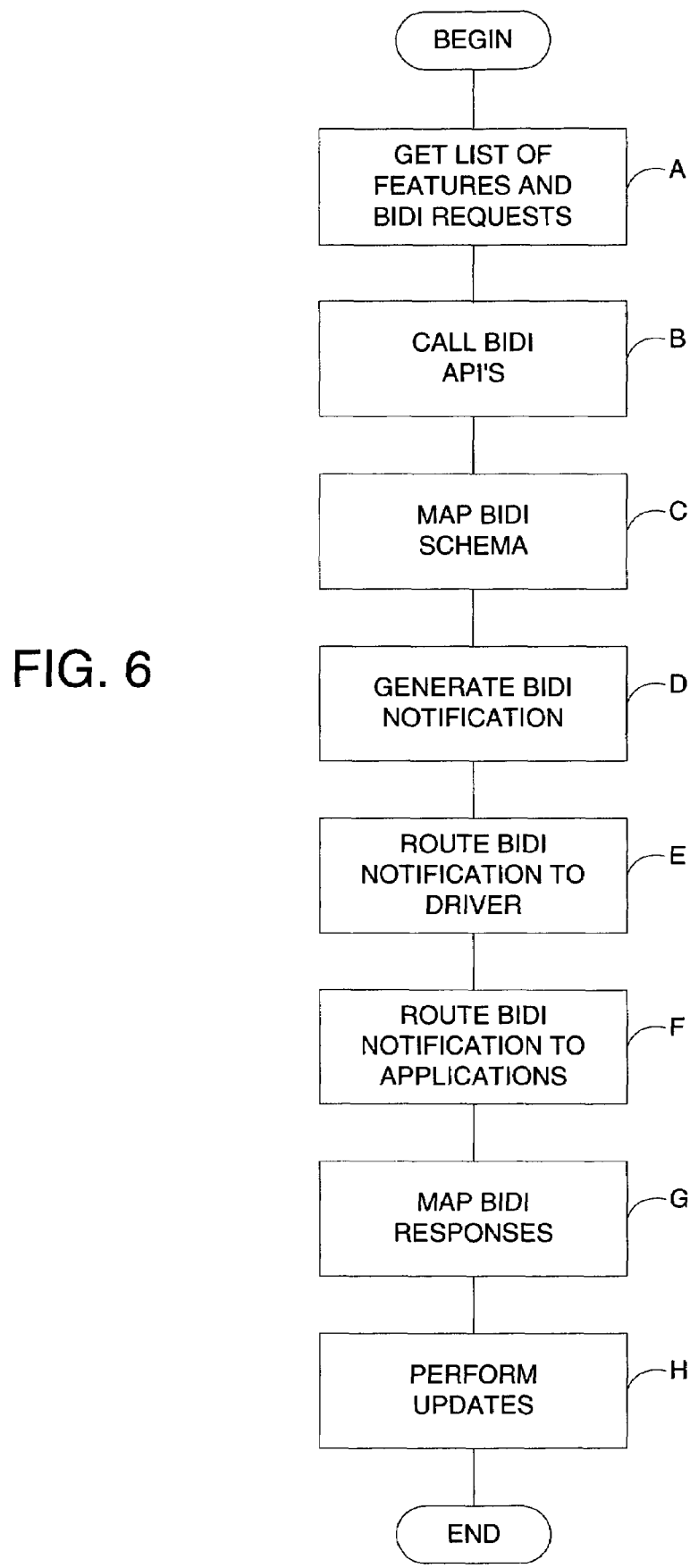
FIG. 6 is a flow chart illustrating a method for automatic configuration in accordance with an embodiment of the invention.

FIG. 6 is a flow chart illustrating a process for automatically updating a system configuration upon installation of a network printer or upon the addition of printer features. At printer installation time or when the printer configuration changes, the driver 30 gets notification from the spooler/port monitor via a driver API (drvprinterevent) to perform a series of steps for auto-configuration. In step A, the driver 30 implements an operation to obtain a list of installable features and corresponding bi-directional requests from the printer description file 32. In step B, the driver 30 calls bi-directional APIs 62 from the spooler 60 to query for the current configuration of the feature. In step C, the port monitor 70 maps bidi schema to a printer specific protocol. In step D, the port monitor 70 generates a bidi notification for those schemas that have been changed. In step E, the port monitor 70 using the notification tools 64 routes a bidi notification to the driver 30 using the driver printer event mechanism 65. In step F, the port monitor 70 routes a bidi notification to the applications 10 using the printer change notification mechanism 66. In step G, the driver 30 maps bidi responses to a feature in the printer description file 40 using the bidi response construct. The driver 30 looks at the response data to find the feature and looks at its bidi value for the corresponding option for mapping. In step H, the driver 30 performs updates to the UI and system with the current configuration.

Figure 7:
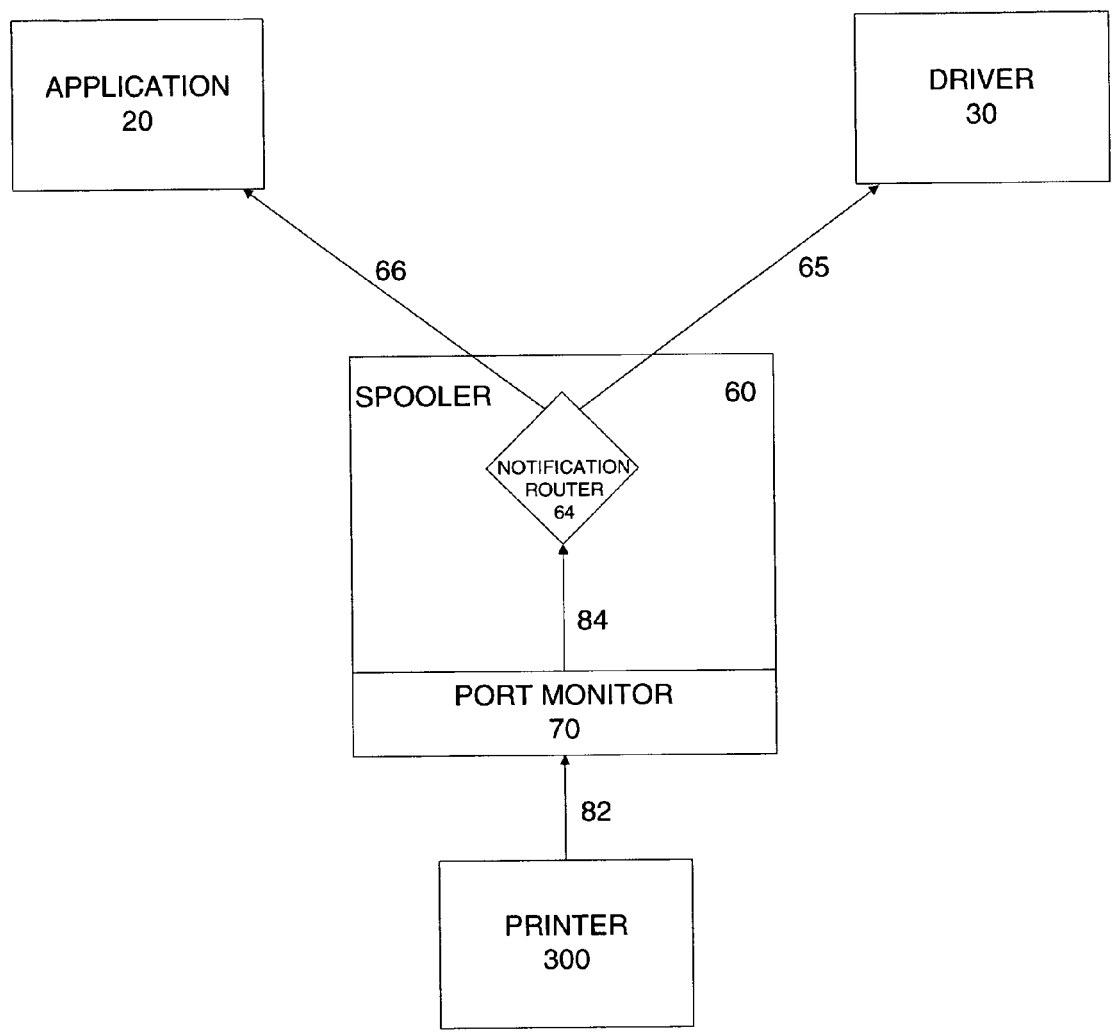
FIG. 7 is a block diagram illustrating an automatic configuration process in accordance with an embodiment of the invention.

FIG. 7 is a block diagram illustrating the interaction between the aforementioned components during a configuration update in an embodiment of the invention. The printer 300 communicates with the port monitor 70 using a printer specific protocol. The port monitor 70 creates a bidi notification channel and the spooler 60 uses the notification tools 64 to route notifications to the application 10 and the driver 30. The port monitor 70 obtains data from an XML file stored in a MIB database connected with the printer 300. The port monitor 70 converts the MIB values to expected values using the bidi schema and creates a response.

In summary, the following features have been disclosed herein as interacting to provide automatic updating of network device capabilities. The invention includes: (a) a syntax for representing and associating a bidi request and response with a feature via the printer description files 40 (ii) an abstraction of the device specific protocols via a set of bidi APIs 62 (iii) a schema for the bidi APIs in an extension file 34 and (iv) a notification infrastructure 64.

Although the invention is described above in connection with automatic configuration of a system in order to fully use print capabilities, the features of the invention could also be used for additional purposes. For example, the components described above could be used for print validation. If a conflict exists between a job ticket and the printer configuration, the auto configuration components can notify the user or perform automatic resolution to avoid putting the device in an error state.

Using the above-described components, print validation occurs. After print validation, the spooler 60 calls a print validation API from the set of APIs 62. If the IHV plug-ins 50 prevent use of the print validation API, the IHV 50 can perform a print validation check of the current configuration and current job settings. In either case, the spooler 60 returns a result to the driver 30 and the driver 30 ensures that the correct user interface 20 is displayed to the user. The user interface 20 should instruct the user on how to proceed with the job. The user can make recommended changes or ask the system to perform automatic configuration.

Additionally, the above-described components could be used to facilitate resource management. The resource management solution involves a print time query to track resources available for font management or forms management. Prior to the automatic configuration solution, the driver 30 generally makes a guess as to what resources are available. When guesses are wrong, the printer 300 runs out of memory and output errors occur.

The automatic configuration system and method described herein have many advantages. The invention eliminates configuration steps manually performed after device installation to obtain a correct feature set. Furthermore, the components described above allow automatic updates of configuration changes. Changes to the UI 20 are also made automatically and the system responds automatically to reflect changes. Accordingly, if an administrator adds or removes installable options, the UI becomes automatically aware of the changes.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and with the scope of the claims.

We claim:

1. A system for automatic configuration upon installation of a network printer, wherein the network printer is associated with printer description files, a driver, a spooler, and a port monitor, the system comprising:
    bi-directional application program interfaces associated with the spooler for allowing the driver to generate a request and a response, the bi-directional application program interfaces that seek a list of one or more installable features upon installation of the network printer;
    a syntax within the printer description files for representing and associating the request and the response with a print feature, the syntax including one or more extensions to the printer description files;
    extension files stored in the driver for relating bi-directional values and printer values, the bi-directional values that enable a client to generate a request and interpret a response;
    a notification infrastructure controlled by the port monitor for providing a bi-directional notification of configuration changes to the driver and selected applications; and
    a computer storage medium for storing information related to automatic configuration upon installation of the network printer,
    wherein the bi-directional application program interfaces perform an auto-configuration of the system upon installation of the network printer, the auto-configuration including configuration of the one or more installable features and the auto-configuration performed independent of input from one or more users at one or more computers.

2. The system of claim 1, wherein the notification infrastructure includes a drive printer event mechanism for informing the driver of a configuration change.

3. The system of claim 1, wherein the notification infrastructure includes a find next printer change notification for allowing an application to monitor and receive configuration changes automatically.

4. The system of claim 1, wherein the syntax additionally comprises a plurality of keywords including a response type keyword for designating a bi-directional response type and a response data keyword for mapping between features of the network printer.

5. The system of claim 1, wherein the syntax provides tools for providing updates at a global level, at an option level, and at a feature level.

6. The system of claim 1, further comprising independent hardware vendor extensions for enumerating specific features provided by a manufacturer.

7. The system of claim 1, wherein the bi-directional application program interfaces provide tools for supporting a get action, a set action, and an enumerate action.

8. The system of claim 1, wherein port monitor includes a mechanism for retrieving data from a network printer database and for accessing the extension files to transform the data.

9. The system of claim 8, wherein the bi-directional application program interfaces provide a mechanism for returning the data retrieved by the port monitor.

10. A system for facilitating client retrieval of bi-directional information upon installation of a network device, the system comprising:
    a set of bi-directional constructs within a printer description file, the bi-directional constructs seek a list of one or more installable features upon installation of the network device;
    a port monitor for receiving the bi-directional constructs, for retrieving data from the network device in accordance with the bi-directional constructs, transforming the data into an appropriate format, creating a channel, and sending the transformed data;
    a spooler including a mechanism for receiving installation notifications over the created channel from the port monitor and routing the installation notifications to selected applications; and
    a computer storage medium for storing information related to automatic configuration upon installation of a network printer,
    wherein the bi-directional constructs perform an auto-configuration of the system upon installation of the network printer, the auto-configuration including configuration of the one or more installable features and the auto-configuration performed independent of input from of one or more users at one or more client computers,
    wherein the auto-configuration provides for automatically updating the system upon installation of the network printer independent of user intervention:
    wherein the bi-directional constructs monitor and recognize an acquiring of additional printer features, and
    wherein the additional printer features are automatically updated when recognized.

11. The system of claim 10, wherein spooler comprises a drive printer event mechanism for informing a driver of a configuration change.

12. The system of claim 10, wherein the spooler comprises a find next printer change notification for allowing an application to monitor and receive configuration changes automatically.

13. The system of claim 10, wherein the set of bi-directional constructs includes a bi-directional query construct and a bi-directional response construct.

14. The system of claim 13, wherein the printer description file comprises a plurality of keywords including a response type keyword for designating a bi-directional response type and a response data keyword for mapping between features of the network printer.

15. The system of claim 14, wherein the bi-directional constructs and the keywords form a syntax providing tools for making automatic updates at a global level, at an option level, and at a feature level.

16. The system of claim 10, further comprising independent hardware vendor extensions for enumerating specific features provided by a manufacturer.

17. The system of claim 10, further comprising bi-directional application program interfaces within the spooler for allowing transmittal of a bi-directional request and a bidirectional response.

18. The system of claim 17, wherein the bi-directional application program interfaces provide tools for supporting a get action, a set action, and an enumerate action.

19. The system of claim 10, wherein the port monitor includes a mechanism for retrieving data from a network printer database and for accessing extension files within a driver to transform the received data.

20. The system of claim 19, wherein the bi-directional application program interfaces provide a mechanism for returning the data retrieved by the port monitor.

21. One or more computer-readable storage media having computer useable instructions embodied thereon for performing a method for automatically configuring a system upon installation of a network printer within the system, wherein the system includes printer description files, a driver, a spooler, and a port monitor, the method comprising:

getting, upon installation of the network printer, a list of installable features and corresponding bi-directional requests from the printer description files;

calling bi-directional application program interfaces from the spooler to query for a current configuration of the installable features;

mapping bi-directional schema to a printer-specific protocol; generating and routing a bi-directional notification;

mapping bi-directional responses to a feature from the printer description file; and updating an application with a current configuration, wherein updating the application with the current configuration includes performing an auto-configuration of the system upon installation of the network printer, the auto-configuration including configuration of the installable features: wherein the auto-configuration is performed independent of input from one or more users at one or more client computers.

22. The media of claim 21, wherein routing a bi-directional notification comprises routing a drive printer event notification to the driver to inform the driver of a configuration change.

23. The media of claim 21, wherein routing a bi-directional notification comprises routing a find next printer change notification to an application to allow the application to monitor and receive configuration changes automatically.

24. The media of claim 21, further comprising implementing a plurality of keywords including a response type keyword for designating a bi-directional response type and a response data keyword for mapping between features of the network printer.

25. The media of claim 21, further comprising providing automatic configuration updates at a global level, at an option level, and at a feature level.

26. The media of claim 21, further comprising implementing independent hardware vendor extensions for enumerating specific features provided by a manufacturer.

27. The media of claim 21, further comprising implementing the bidirectional application program interfaces to provide tools for supporting a get action, a set action, and an enumerate action.

28. The media of claim 21, further comprising using the port monitor for retrieving data from a network printer database and accessing extension files from the printer description files in order to transform the data.

29. The media of claim 28, further comprising using the bi-directional application program interfaces for returning the data retrieved by the port monitor.

30. One or more computer-readable storage media having computer useable instructions embodied thereon for performing a method for providing extensibility for a port monitor in order to enable vendors to define new mappings using existing public bi-directional schema and extensions to existing schema, the method comprising:

permitting, upon installation of a network printer, the use of an extension file describing a mapping between bi-directional values and device-specific objects, the extension file seeks a current configuration of the network printer; and allowing implementation of the extension file to facilitate a port monitor response to a bidirectional request, wherein the extension file provides for auto-configuration of a system, the auto-configuration including configuration of the system to recognize the device-specific objects and current configuration of the network printer, wherein the auto-configuration is performed independent of input from of one or more users at one or more client computers.

31. The media of claim 30, wherein the extension file is an XML extension file.

32. The media of claim 30, wherein the extension file comprises independent hardware vendor extensions of standard bi-directional schema.

* * * * *